United States Patent Office
3,365,314
Patented Jan. 23, 1968

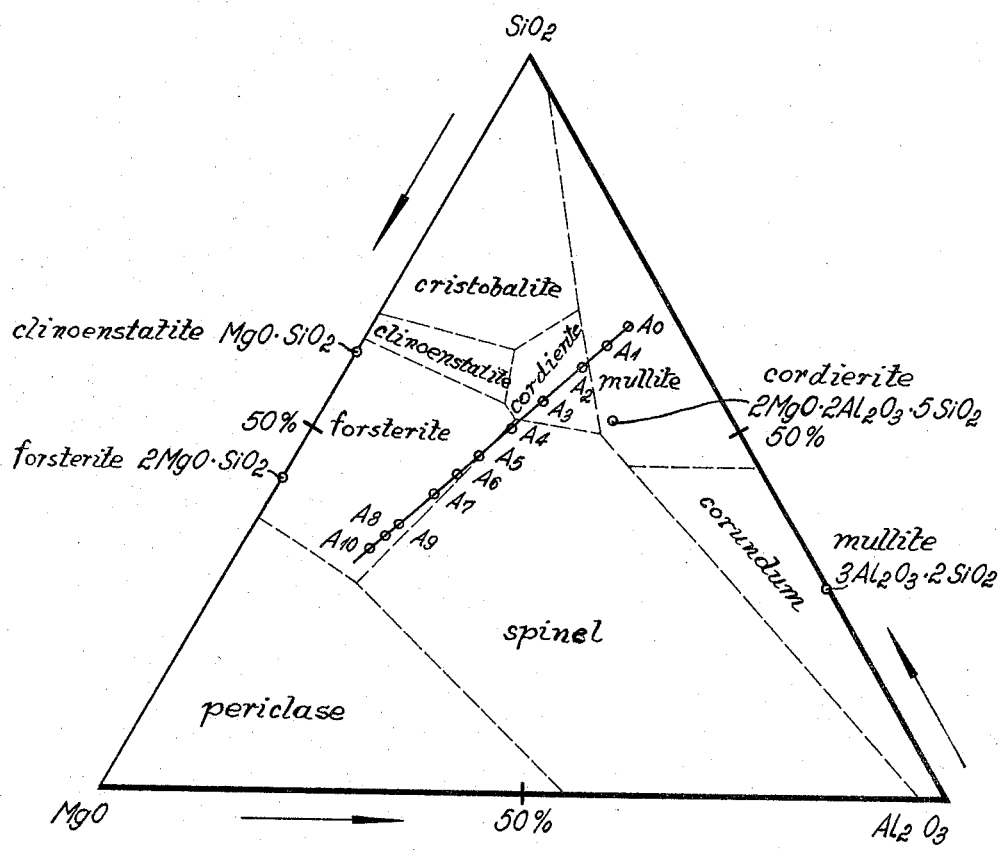

3,365,314
METHOD OF PRODUCING ARTICLES CONTAINING PREDOMINANTLY CORDIERITE, ANORTHITE, SPINEL AND/OR FORSTERITE
Werner Sack, Mainz, Germany, assignor to Jenaer Glaswerk Schott & Gen., Mainz, Germany
Filed Nov. 5, 1963, Ser. No. 321,565
Claims priority, application Germany, Nov. 14, 1962, J 22,652; Mar. 16, 1963, J 23,373
2 Claims. (Cl. 106—39)

ABSTRACT OF THE DISCLOSURE

A method of producing crystalline articles containing predominantly cordierite, anorthite, spinel and forsterite. Magnesium oxide, as an inorganic substance, is added to a finely ground high-alumina silicate glass powder, and the mixture is heated and sintered causing the components to chemically react.

The invention relates to a method of producing vitreous articles which contain predominantly cordierite and/or anorthite and/or spinel and/or forsterite.

It has been proposed heretofore to add inorganic compounds to a silicate glass powder, to heat and sinter the mixture and to keep the sinter temperature constant for a certain period of time during which the components of the mixture are brought to react and devitrify. This method succeeded in producing sinter bodies which are distinguished from common glass by substantially different physical properties. The molding of the substances into the form of the desired articles is done, for instance, by employing a vacuum piston press and thus it is possible to produce tubes, rods and other profile articles. The vacuum-tight sintering of these articles takes place either in a horizontal or a suspended position in electrically heated furnaces at a temperature which is raised step by step up to 1400° C. during a time period of maximum six hours. The technology of processing and finishing corresponds to that of ceramic masses.

It is an object of the invention to produce crystalline articles, such as plates, rods, tubes, spark-plug bodies, heat resistant cooking ware, etc. The principle chemical compound of these articles is selectively cordierite and/or anorthite and/or spinel and/or forsterite, and this compound in accordance with a conventional method is produced by adding magnesium oxide as an inorganic substance to a high-alumina silicate glass powder. Contrary to the products of oxide ceramics and of ceramics in general, the crystalline phases of cordierite $$(2MgO \cdot 2Al_2O_3 \cdot 5SiO_2)$$

and forsterite $(2MgO \cdot SiO_2)$ in addition to anorthite $(CaO \cdot Al_2O_3 \cdot SiO_2)$ and spinel $(MgO \cdot Al_2O_3)$ are produced by way of a chemical reaction of the glass composition with the added magnesium oxide and this chemical reaction takes place only during the sintering phase of the glass. This method is a new way of producing crystalline bodies and particularly of substances containing cordierite and forsterite.

By varying the quantity ratio of glass to magnesium oxide powder the proportions of the crystal phases to each other may be changed and therewith also the physical properties important for the actual technical application, such as the linear thermic coefficient of expansion, the phase angle difference of a condenser and the dielectric constant. The linear thermal coefficients of expansion $\alpha \cdot 10^7$ (40–800° C.)/° C. of the articles thus produced may be continuously varied between 45 and 107. The phase angle differences $tg\delta$ at 10 mHz. are between 2 and $6 \cdot 10^{-4}$, and the dielectric constants are between 8 and 10. These qualities are especially advantageous when the articles are used in the electric field, praticularly in electronics, because it is made possible to adapt the coefficients of expansion to every metal part to be welded in or on, while the extraordinary good electrical properties are retained.

The single figure of the drawing shows a phase diagram of the three component system $SiO_2 = Al_2O_3 = MgO$.

It has been discovered that high-alumina silicate glass powder of the following composition is especially suited for obtaining the desired physical and chemical properties of the articles.

| | Percent by weight |
|---|---|
| $SiO_2$ | 54–68 |
| $Al_2O_3$ | 17–27 |
| $MgO$ | 4–12 |
| $CaO$ | 0–10 |
| $BaO$ | 0–1 |
| $B_2O_3$ | 0–3 |
| $TiO_2$ | 0–3 |
| $F$ | 0–0.5 |
| Alkalies, max. | 0.4 |

In the following will be described by way of example the process of producing articles in accordance with the invention.

I. (1) *Starting materials.*—The employed glass powder having a grain size of $<60\mu$ was obtained by dry grinding a practically alkali-free high-alumina glass of the following composition:

| | Percent by weight |
|---|---|
| $SiO_2$ | 54.50 |
| $Al_2O_3$ | 26.40 |
| $CaO$ | 10.00 |
| $B_2O_3$ | 2.90 |
| $Na_2O$ | 0.30 |
| $K_2O$ | 0.10 |
| $BaO$ | 0.90 |
| $MgO$ | 4.60 |
| $F$ | 0.30 |

The glass possesses the following physical properties:

| | |
|---|---|
| $\alpha \cdot 10^7$ (20–300° C.) ° C. | 41.0 |
| Transformation point $T_g$ ° C. | 740 |
| Softening point $E_w$ ° C. | 960 |
| Processing point $V_A$ ° C. | 1245 |
| $T_{K100}$ (temperature for $\rho = 10^8 \Omega \cdot cm$.) | 612 |
| Density (g./ccm.) | 2.59 |

The magnesium oxide powder employed for producing the various mixtures contained:

| | Percent by weight |
|---|---|
| $MgO$ | 87.14 |
| $SiO_2$ | 3.08 |
| $CaO$ | 1.93 |
| Heat loss | 7.00 | and had a grain size of $<40\mu$.

(2) *Making of the mixtures, forming, sintering.*—The glass powder with the magnesium oxide powder added thereto is ground wet in a hard porcelain ball mill in a water-free medium, such as acetone, amylalcohol or fuel alcohol to a grain size of $<5\mu$. Subsequently, this mixture is filtered, dried and passed through a $60\mu$ mesh. Finally, this powder is added 4 to 8% of a plasticizer, such as for instance cellulose derivatives or wax emulsions, and this mass is put into granulators and there brought into a moldable condition. The molding is done by means of vacuum extruders or vacuum piston presses. The burning out of the binder and the sintering of the articles takes place in a horizontal or a suspended position in electric furnaces at temperatures which are step by step increased up to a maximum of 1400° C. The lowest sinter temperature is 30–50° C. above the softening point of the glass component. A sintering time period of more than six hours is not required.

The following Table 1 contains the weight percentage ratios of several mixtures of glass and magnesium oxide powders and of the articles A1 to A10 manufactured from these mixtures. A0 designates the sintered glass powder without the addition of MgO. The individual components of the mixture A0 may be varied in their weight percentage within certain limits and these limits are given by the requirement that the formation of cordierite, anorthite, spinel and forsterite must not be changed, in accordance with the X-ray results given in Table 2.

Symbols: v.m.=very much; m.=much; l.=little; v.l.= very little; v.v.l.=very very little.

As is disclosed in Table 2, cordierite and anorthite crystallize in pure sinter glass (A0). With increasing addition of MgO the cordierite content decreases substantially, to a lesser extent also the anorthite content, while the ratios of forsterite and spinel increase considerably. The sequence cordierite-forsterite-spinel with increasing addition of MgO is in conformance with the concentration proportions of the chief components $SiO_2$, $Al_2O_3$, MgO in the sinter bodies.

In the mixtures of the samples A0 to A10 the components $SiO_2$, $Al_2O_3$ and MgO are to be regarded the chief components. Except for a certain significance of CaO for the formation of anorthite, the remaining components play a subordinate part. If only the percent ratio of these chief components to each other in the samples A0 to A10 is considered, the following values will be obtained:

TABLE 1

| Sample No. | Added MgO in weight percent | Weight percentage ratio of the glass/MgO powder mixtures and the sinter bodies manufactured therefrom | | | | | | | | |
|---|---|---|---|---|---|---|---|---|---|---|
| | | $SiO_2$ | MgO | $Al_2O_3$ | $B_2O_3$ | CaO | BaO | $Na_2O$ | $K_2O$ | F |
| A0 | | 54.50 | 4.60 | 26.40 | 2.90 | 10.00 | 0.90 | 0.30 | 0.10 | 0.30 |
| A1 | 4.17 | 52.10 | 8.50 | 25.20 | 2.80 | 9.70 | 0.90 | 0.30 | 0.10 | 0.30 |
| A2 | 7.97 | 50.10 | 12.20 | 24.20 | 2.30 | 9.40 | 0.90 | 0.30 | 0.10 | 0.30 |
| A3 | 14.70 | 46.60 | 18.50 | 22.30 | 2.40 | 8.80 | 0.80 | 0.30 | 0.10 | 0.30 |
| A4 | 20.40 | 43.30 | 24.10 | 20.60 | 2.20 | 8.30 | 0.70 | 0.20 | 0.10 | 0.20 |
| A5 | 25.45 | 40.80 | 28.80 | 19.40 | 2.00 | 7.90 | 0.60 | 0.20 | 0.10 | 0.20 |
| A6 | 29.85 | 38.20 | 32.90 | 18.00 | 1.90 | 7.50 | 0.60 | 0.20 | 0.10 | 0.20 |
| A7 | 33.45 | 36.20 | 36.50 | 16.90 | 1.80 | 7.20 | 0.60 | 0.20 | 0.10 | 0.20 |
| A8 | 40.15 | 32.60 | 42.60 | 15.10 | 1.60 | 6.60 | 0.50 | 0.20 | 0.10 | 0.20 |
| A9 | 42.85 | 31.10 | 45.20 | 14.40 | 1.60 | 6.40 | 0.50 | 0.20 | 0.10 | 0.20 |
| A10 | 45.40 | 29.80 | 47.60 | 13.70 | 1.50 | 6.20 | 0.50 | 0.10 | 0.10 | 0.10 |

II. *Crystalline phase contents of the sinter bodies A0 to A10.*—During the sinter process takes place a crystallization of the glass sinter body A0 as well as of the mixed bodies A1 to A10 owing to the chemical reaction of the glass component with the added magnesium oxide, whereby cordierite, anorthite, forsterite and spinel are formed. X-ray diffraction exposures of these finely powdered samples with Cu-Kα radiation show the following results:

TABLE 2

| Sample No. | Cordierite [1] | Anorthite [2] | Forsterite [3] | Spinel [4] |
|---|---|---|---|---|
| A0 | v.m. | m. | | |
| A1 | m. | m. | v.v.l. | |
| A2 | m. | m. | v.v.l. | |
| A3 | m. | v.m. | v.l. | |
| A4 | l. | m. | l. | |
| A5 | v.l. | m. | m. | v.l. |
| A6 | v.v.l. | l. | m. | l. |
| A7 | v.v.l. | l. | v.m. | l. |
| A8 | | v.v.l. | v.m. | m. |
| A9 | | v.v.l. | v.m. | m. |
| A10 | | v.v.l. | v.m. | m. |

[1] $2MgO \cdot 2Al_2O_3 \cdot 5SiO_2$.
[2] $CaO \cdot Al_2O_3 \cdot SiO_2$.
[3] $2MgO \cdot SiO_2$.
[4] $MgO \cdot Al_2O_3$.

TABLE 3

| Sample No. | Ratio of the chief components in percent by weight of— | | |
|---|---|---|---|
| | $SiO_2$ | $Al_2O_3$ | MgO |
| A0 | 63.70 | 30.90 | 5.40 |
| A1 | 60.70 | 29.40 | 9.90 |
| A2 | 57.90 | 28.00 | 14.10 |
| A3 | 53.30 | 25.50 | 21.20 |
| A4 | 49.20 | 23.40 | 27.40 |
| A5 | 45.80 | 21.80 | 32.40 |
| A6 | 42.90 | 20.20 | 36.90 |
| A7 | 40.40 | 18.90 | 40.70 |
| A8 | 36.10 | 16.70 | 47.20 |
| A9 | 34.30 | 15.90 | 49.80 |
| A10 | 32.70 | 15.00 | 52.30 |

In comparison to the ratio values of the chief components in Table 3, the Table 4 indicates the corresponding values for cordierite, forsterite, spinel and anorthite, along with the linear thermic coefficients of expansion α taken from the prior art.

TABLE 4

| Type of crystal | Percent by weight of— | | | | Linear thermic coefficient of expansion $\alpha \cdot 10^{-7}/°$ C. within room temperature up to— | | |
|---|---|---|---|---|---|---|---|
| | $SiO_2$ | $Al_2O_3$ | MgO | CaO | 300° C. | 500° C. | 700° C. |
| Cordierite $2MgO \cdot 2Al_2O_3 \cdot 5SiO_2$ | 51.4 | 34.8 | 13.8 | | [1] 11 | | |
| Forsterite $2MgO \cdot SiO_2$ | 42.8 | | 57.2 | | | | [2] 105–112 |
| Spinel $MgO \cdot Al_2O_3$ | | 71.7 | 28.3 | | | [1] 75 | |
| Anorthite $CaO \cdot Al_2O_3 \cdot 2SiO_2$ | 43.2 | 36.6 | | 20.2 | [1] 43 | | |

[1] R. F. Geller, J. Res. Nat. Bur. Stand. 9 (1932).
[2] W. Espe, Werkstoffkunde der Hochvakuumtechnik, vol. II (1960), p. 514.

The phase diagram of the three component system $SiO_2$—$Al_2O_3$—$MgO$ illustrates the weight percentages of the chief components $SiO_2$, $Al_2O_3$ and $MgO$ taken from Table 3. It will be noted that the compositions of the samples A0 to A10 are positioned in a straight line. A0 and A1 are in the mullite region, A2 and A3 are in the cordierite region and from A4 to A10 the compositions move between spinel and forsterite. This position of the samples A0 to A10 in the phase diagram is in agreement with the X-ray results shown in Table 2.

What I claim is:

1. A method of producing crystalline articles containing predominantly substances selected from the group consisting of cordierite, anorthite, spinel and forsterite, whereby for the controlled selection of crystalline phases of said articles from about 4 to 45° by weight magnesium oxide in powdered form is added to and mixed with a finely ground high-alumina silicate glass in powder form, and the mixture is shaped, heated and sintered and the components of said mixture are caused to chemically react upon heating and to devitrify by maintaining the sintering temperature of the glass until the reaction is completed, said high-alumina silicate glass powder having the following composition:

| | Percent by weight |
|---|---|
| $SiO_2$ | 54 to 68 |
| $Al_2O_3$ | 17 to 27 |
| $MgO$ | 4 to 12 |
| $CaO$ | 0 to 10 |
| $BaO$ | 0 to 1 |
| $B_2O_3$ | 0 to 3 |
| $TiO_2$ | 0 to 3 |
| $F$ | 0 to 0.5 |
| Alkalies, not more than | 0.4 |

2. A method of producing crystalline articles containing predominantly substances selected from the group consisting of cordierite, anorthite, spinel and forsterite, whereby for the controlled selection of crystalline phases of said articles from about 4 to 45% by weight magnesium oxide in powdered form is added to and mixed with a finely ground high alumina silicate glass in powder form, and the mixture is shaped, heated and sintered and the components of said mixture are caused to chemically react upon heating and to devitrify by maintaining the sintering temperature of the glass until the reaction is completed, said high-alumina silicate glass powder having the following composition:

| | Percent by weight |
|---|---|
| $SiO_2$ | 54.50 |
| $Al_2O_3$ | 26.40 |
| $CaO$ | 10.00 |
| $MgO$ | 4.60 |
| $B_2O_3$ | 2.90 |
| $BaO$ | 0.90 |
| $Na_2O+K_2O$, max. | 0.40 |
| $F$ | 0.30 |

References Cited
UNITED STATES PATENTS

| | | | |
|---|---|---|---|
| 3,246,972 | 4/1966 | Smith | 106—39 |
| 3,037,828 | 6/1962 | Michael | 106—48 X |
| 2,920,971 | 1/1960 | Stookey | 106—39 |
| 3,019,116 | 1/1962 | Doucette | 106—62 |
| 3,083,123 | 3/1963 | Navias | 106—62 |
| 3,117,881 | 1/1964 | Henry et al. | 106—39 |

HELEN M. McCARTHY, *Primary Examiner.*